United States Patent [19]

Moser et al.

[11] 4,439,208

[45] Mar. 27, 1984

[54] METHOD FOR IMPROVING THE FASTNESS OF DYEINGS WITH BASIC DYES ON CELLULOSIC SUBSTRATES

[75] Inventors: Helmut Moser, Oberwil; Tibor Robinson, Birsfelden, both of Switzerland

[73] Assignee: Sandoz Ltd., Basel, Switzerland

[21] Appl. No.: 391,014

[22] Filed: Jun. 22, 1982

[30] Foreign Application Priority Data

Jun. 22, 1981 [DE] Fed. Rep. of Germany ....... 3124400
Jun. 22, 1981 [DE] Fed. Rep. of Germany ....... 3124472
Jun. 22, 1981 [DE] Fed. Rep. of Germany ....... 3124477

[51] Int. Cl.³ .................. D06P 3/58; D06M 15/54
[52] U.S. Cl. ......................................... 8/556; 8/496; 8/654; 8/657; 8/658; 8/918; 528/254; 528/262; 528/263; 528/266; 528/268
[58] Field of Search ............... 8/556, 654, 658, 657; 528/254, 262, 263, 266, 268

[56] References Cited

U.S. PATENT DOCUMENTS

| | | |
|---|---|---|
| 3,141,728 | 7/1964 | Bockmann et al. |
| 3,873,266 | 3/1975 | Hofer et al. |
| 3,975,152 | 8/1976 | Harper et al. ........................... 8/496 |
| 4,273,707 | 6/1981 | Pedrazzi ............................... 260/152 |
| 4,292,037 | 9/1981 | Galafassi et al. ................... 8/557 |

FOREIGN PATENT DOCUMENTS

| | | |
|---|---|---|
| 912,348 | 12/1962 | United Kingdom . |
| 2070006 | 9/1981 | United Kingdom . |
| 2084597 | 4/1982 | United Kingdom . |
| 2086947 | 5/1982 | United Kingdom . |
| 2098619 | 11/1982 | United Kingdom . |
| 2098620 | 11/1982 | United Kingdom . |
| 2099007 | 12/1982 | United Kingdom . |

*Primary Examiner*—A. Lionel Clingman
*Attorney, Agent, or Firm*—Gerald D. Sharkin; Richard E. Vila; Thomas C. Doyle

[57] ABSTRACT

The fastness properties of basic dyeings on cellulosic substrates are improved by treating the substrate with a fixing agent comprising a precondensate or mixture of
(A) the reaction product of an amine with cyanamide, dicyandiamide, guanidine or biguanidine, or,
(B) a quaternary polyalkylene polyamine with
(C) formaldehyde and/or,
(D) an N-methylol compound optionally together with
(E) a catalyst, e.g. $MgCl_2$.

The fixing agents are normally applied as an aftertreatment, with a subsequent heat-curing step.

27 Claims, No Drawings

METHOD FOR IMPROVING THE FASTNESS OF DYEINGS WITH BASIC DYES ON CELLULOSIC SUBSTRATES

This invention relates to a textile treatment process for improving fastness properties, in particular the light and wash fastness properties of dyeings and printings on hydroxy group-containing substrates with basic dyestuffs.

The invention provides a process for producing fast dyeings and printings on a hydroxy group-containing substrate by applying a basic dyestuff to the substrate and treating the substrate either subsequently or simultaneously with a fixing agent comprising a precondensate or mixture of either (A) the product of reacting a mono- or polyfunctional primary or secondary amine with cyanamide, dicyandiamide (DCDA), guanidine or biguanidine; or ammonia with cyanamide or DCDA; whereby up to 50 mole % of the cyanamide, DCDA, guanidine or biguanide may be replaced with a dicarboxylic acid or a mono- or di-ester thereof, said product (A) containing reactive hydrogen atoms bound to nitrogen, or, (B) a quaternary polyalkylene polyamine with, (C) formaldehyde or a formaldehyde precursor and/or (D) an N-methylol derivative of a urea, melamine, guanamine, triazinone, urone, carbamate or acid amide, optionally together with (E) a catalyst for the crosslinking of N-methylol compounds of the type (D) above, and preferably carrying out a subsequent heat-curing step.

Preferred fixing agents comprise precondensates or mixtures of (A) with (D), (B) with (D) and (A) with (C), optionally together with (D). Preferably catalyst (E) is also present. Preferred fixing agents comprise precondensates, that is, reaction products which remain water-soluble and non-gelled, and are capable of further crosslinking.

The substrate may be treated with the basic dyestuff simultaneously with the fixing agent, i.e. in the same bath for an exhaust or padding process, or in the same printing paste for a printing process. Alternatively the fixing agent may be applied as an aftertreatment to the already dyed or printed substrate. In both cases the fixing agent may already contain the catalyst (E) or the catalyst may be applied separately in a subsequent step. Where the fixing agent contains a precondensate and a catalyst, the catalyst may be added before, during or after the reaction which gives rise to the precondensate, but preferably this reaction takes place in the presence of the catalyst.

Component (A) is preferably the reaction product of a polyfunctional amine of formula I

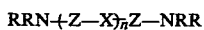

$$RRN\!\!+\!\!Z\!\!-\!\!X\!\!\!)_n\!Z\!\!-\!\!NRR \qquad I$$

in which each
R independently is hydrogen or a $C_{1-10}$alkyl group unsubstituted or monosubstituted with hydroxy, $C_{1-4}$alkoxy or cyano,
n is a number from 0 to 100
Z, or each Z independently when $n>0$, is $C_{1-4}$alkylene or hydroxyalkylene and
X, or each X independently when $n>1$,
is —O—, —S— or —NR— where R is as defined above, provided that the amine of formula I contains at least one reactive —NH— or —NH$_2$ group, with cyanamide, DCDA, guanidine or biguanidine, particularly DCDA.

R is preferably hydrogen or $C_{1-4}$alkyl or hydroxyalkyl, more preferably each R is hydrogen. n is preferably a number from 0 to 30, which may be non-integral representing an average value. More preferably n is an integer from 1 to 6. Z is preferably a 1,2-ethylene, 1,3-propylene or 1,3-(2-hydroxypropylene)group, X is preferably —NR—, most preferably —NH—.

Particularly preferred amines are diethylene triamine, triethylene tetramine, tetraethylenepentamine, 2-aminoethyl-3-aminopropylamine, dipropylenetriamine or N,N-bis-(3-aminopropyl)-methylamine. Particularly preferred components (A) are the reaction products of DCDA with diethylenetriamine or triethylene tetramine.

Components (A) are known, and their preparation and their reaction with N-methylol compounds (D) to form precondensates are described in U.S. Pat. No. 4,410,652 and published British Patent Application No. 2070006A, the disclosure of which is incorporated herein by reference.

In component (A), up to 50% mole, preferably up to 20% mole of the DCDA or other reagent to be reacted with the amine may be replaced by a dicarboxylic acid or a mono- or di-ester thereof. Suitable acids include adipic acid, oxalic acid and terephthalic acid, for example in the form of their dimethyl esters.

Preferred compounds of component (B) have recurring units of the formula II

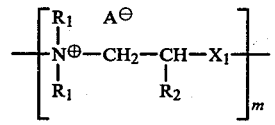

where
$R_1$ is $C_{1-4}$alkyl, $R_2$ is H or OH
$X_1$ is

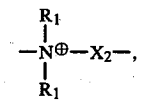

—CH$_2$— or —CH$_2$—CH$_2$— and,
$X_2$ is —CH$_2$CH$_2$—OCH$_2$CH$_2$— or —(CH$_2$)$_b$—
where
m is a number between 7 and 75
b is 1 to 5 and
A$^\ominus$ is an anion.

Preferably the compounds of component (B) have recurring units of formula II'

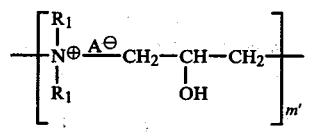

where
$R_1$ is $C_{1-4}$alkyl, preferably methyl m' is 20-30, preferably on average about 25.

Component (B) is known and may be prepared according to known methods, for example by reaction of an N,N'-tetraalkylalkylenediamine with a dichloroalkane, or of a secondary amine with an epihalohydrin, as described in British Pat. No. 1 396 195. Components (B) and their reaction with N-methylol compounds (D) to form precondensates are described in published British Patent Application No. 2 084 597A, the disclosure of which is incorporated herein by reference.

The reaction of component (A) with formaldehyde or a precursor thereof (e.g. paraformaldehyde) (C) is preferably carried out in an aqueous medium at a temperature from 20°-60° C., preferably 40°-50° C. and at a pH>4, preferably between 7 and 11. The formaldehyde may be added in the form of a concentrated (e.g. 37%) aqueous solution. Preferred mole ratios of component (A) to formaldehyde are in the range 1:2-1:6, based on the number of moles of amine originally present.

Suitable N-methylol derivatives (component D) are generally those N-methylol compounds which are known as cross-linking agents for cellulose fibres, and are used to impart a crease-resistant finish to cellulose fabrics. The compounds may contain free N-methylol groups >N—CH$_2$OH, or these may be etherified. Preferred ether derivatives are the lower alkyl ethers having 1 to 4 carbon atoms in the alkyl groups.

Examples of suitable N-methylol compounds are N,N'-dimethylolurea, N,N'-dimethylolurea dimethyl ether, N,N'-tetramethylolacetylenediurea, N,N'-dimethylolpropyleneurea, 4,5-dihydroxy-N,N'-dimethylolethyleneurea, 4,5-dihydroxy-N,N'-dimethylolethyleneurea dimethyl ether, N,N'-dimethylol-5-hydroxypropyleneurea, N,N'-dimethylol-4-methoxy-5,5-dimethylpropyleneurea, N,N'-dimethylolethyleneurea, methoxymethylmelamine, dimethylolalkandioldiurethanes, N,N'-dimethylol-5-alkylhexahydro-1,3,5-triazin-2-ones, N,N'-dimethylolurone and dimethylolcarbamates. These compounds can be used either alone or as mixtures.

Particularly suitable are hydrolysis-resistant reactive resin pecursors, for example N,N'-dimethylol-4,5-dihydroxy- or 4,5-dimethoxy-ethyleneurea, N,N'-dimethylol-4-methoxy-5,5-dimethylpropyleneurea and N,N'-dimethylol carbamates, optionally in etherified form. Preferred ether forms are the methyl and ethyl ether derivatives.

Suitable catalysts (E) are described in U.S. Pat. No. 4,410,652 and British Pat. applications Nos. 2070006A and 2084597A.

Preferred catalysts are the nitrates, sulphates, chlorides and dihydrogen orthophosphates of aluminium, magnesium or zinc, more preferably of magnesium, particularly magnesium chloride, optionally together with an alkali metal sulphate, particularly sodium sulphate.

When (A) or (B) is used with (D) in the absence of formaldehyde (C), the preferred weight ratios of (A) or (B) to (D) and catalyst (E) lie in the range 1:0.625-22:0.025-6, preferably in the range 1:1.75-7.5:0.25-1.5, based on the dry weight of active components. When N-methylol compound (D) is present together with a precondensate of (A) and formaldehyde (C), it is preferably present to the extent of 50-200% of the weight of (A)+(C). The amount of catalyst used is then preferably about 7.5-12.5% by weight of the dry weight of (D).

The hydroxy group-containing substrate is preferably a cellulosic fibrous substrate comprising natural or regenerated cellulose, particularly cotton and viscose rayon, alone or mixed with synthetic fibres. The substrate may be dyed or printed with basic dyestuffs by any conventional methods, for example dyeing may be carried out by exhaust methods or by padding followed by thermofixation or cold dwell fixation.

When the fixing agent is to be used as an aftertreatment agent, it is applied to a substrate on which the dyeing or printing process including any necessary fixation step, has been completed. The substrate may be dry, or may still be damp, provided that it is not so wet that it is incapable of further pick-up. The aftertreatment agent is applied to the substrate in aqueous solution by dipping, spraying, foam application, padding or other conventional application techniques. The preferred application method is by padding at room temperature.

For application by padding, the quantities in which the product according to the invention is applied to the substrate depend largely upon the depth of the dyeing which is to be fixed. For dyeings of 1/1 standard depth on cotton the quantities used are 30-200 g/l of the padding liquor when applied at a pick-up of 70-100% of the dry weight of the goods. Preferably the quantity is 70-140 g/l for cotton, in order to obtain a wash-resistant improvement in wet fastness together with adequate crease resistance, and 100-200 g/l for regenerated cellulose. For application to mixtures of cellulose fibres and synthetic fibres, the quantity to be applied is calculated on the basis of the cellulose content of the substrate.

The padding liquor may contain further auxiliaries such as stiffening agents, softening agents, agents to improve the rubbing or breaking strength, soil-release products, hydrophobic agents and others provided that these are capable of forming stable aqueous solution when mixed with the product according to the invention.

When the fixing agent is applied simultaneously with the dyestuff, it may be added to the padding liquor in the same quantities as indicated above. When application is by exhaust, then when a long liquor to goods ratio (>10:1) is used the concentration of fixing agent in the liquor is preferably 1-10 g/l, more preferably 2-5 g/l, while for short liquor processes quantities of up to 20 or even 100 g/l my be necessary. (All weights are based on the dry weight of active components.) In simultaneous application from an exhaust bath, a subsequent heat curing step may not be necessary.

Generally, however, there will be a final heat curing step such as is conventional for resin treatment based on compounds of type (D). The substrate may for example be dried at 70°-120° C. and finally crosslinked at a temperature of 130°-180° C. for 2 to 8 minutes, or alternatively simultaneously dried and crosslinked by heat treatment at 100°-200° C., preferably 140°-180° C. for 5 seconds to 8 minutes depending on the temperature. A preferred process involves heating the padded substrate to 170°-180° C. for 30 seconds to 1 minute.

By basic dyestuffs are meant those containing one or more groups selected from protonatable amino groups; cationic groups, e.g. quaternary ammonium groups; and cycloimmonium grops, i.e. unsaturated nitrogen-containing heterocyclic groups. Such heterocyclic groups may form part of the chromophoric system, or may be joined to the chromophore directly or via a bridging group. The basic dyestuffs may be mono- or polyazo dyes, and may be metal-free or may be 1:1 or 1:1 complexes with metals, e.g. Cu, Cr, Co, Ni, Zn, Fe and Mn. Basic dyes may also be of the anthraquinone, diphenyl- or triphenylmethane, styryl, azomethine, hydrazone, nitro, phthalocyanine, naphthoquinone or quinophthalone types.

They are predominantly dyestuffs which contain one or more protonatable amino or quaternary ammonium groups bound directly or via a bridging group to a carbocyclic or heterocyclic aromatic nucleus. Azo dyestuffs containing an acetoacetyl-alkyl- or -arylamide coupling component are also relevant. Protonatable groups include primary, secondary and tertiary amino groups, particularly alkylamino groups, as well as cyclic amines such as morpholine, piperidine, pyrrolidine, piperazine or aziridine.

As a rule, basic dyestuffs are free of sulphonic acid groups, and are used primarily for dyeing and printing of cellulose, including cotton and paper, but also of polyacrylonitrile, leather or acidmodified polyamide or polyester. There are however basic dyestuffs which contain sulphonic acid groups as well as basic groups, for example basic phthalocyanine dyestuffs or, for example dyestuffs such as disclosed in the claims and examples of U.S. Pat. No. 4,273,707, British Patent Application No. 2081734 A and European Patent Application No. 51 041. These dyestuffs may also be used in the process of the invention.

In principle any basic dyestuff, including any of those listed in the Color Index under C.I. Basic Dyes, e.g. C.I. Basic Red 27, may be used in the process of this invention. Suitable basic dyestuffs, for example, include those described and claimed in any of the following:

German Pat. Nos. 1 011 396, 1 014 519, 1 444 715, 1 444 716, 2 054 697;

German Published Applications (DOS) Nos. 2 548 009, 2 061 964, 2 809 601;

French Pat. Nos. 1 495 232, 1 541 429, 1 563 323, 2 000 639;

British Pat. Nos. 576 270, 1 088 611, 1 185 791, 1 273 748, 1 547 900, 1 568 767;

Belgian Pat. Nos. 553 773, 633 447;

Swiss Pat. Nos. 464 392, 534 773, 546 269, 547 337, 554 398, 554 399, 560 241, 563 430;

European patent application No. 41 040.

Preferred dyestuffs are those having a molecular weight (in cationic or protonated form without metal ions) of from 400 to 1200, preferably 450 to 1000, more preferably 500-950, and which give a degree of exhaustion (ratio between dyestuff exhausted and dyestuff originally in the dyebath) on mercerised cotton in a 1/1 standard depth dyeing from an electrolyte free dyebath at a goods to liquor ratio of 1:20, after 90 minutes at the boil, of from 50 to 100%, preferably 70-100%, more preferably 80-100%, particularly 90-100%. The 1/1 standard depth is defined according to DIN standard 54 000 or ISO standard RIOS/I, 1959, part 1.

Such conditions are met by the majority of the dyestuffs disclosed and claimed in German published patent application Nos. 2 000 639 and 2 548 009, British Pat. Nos. 576 270, 1 185 791 and 1 547 900, U.S. Pat. No. 4,273,707, French Pat. No. 1 495 232, European patent application Nos. 41 040 and 51 041, and British Published Patent Application No. 2081734 A. Further suitable dyestuffs are those of formula:

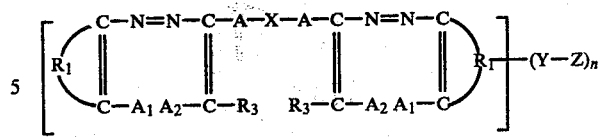

in metal-free or in 2:1 metallised form
in which
$A_1$, $A_2$, A, X, Y, Z, n and $R_3$ have the significances given in British Published Patent Application No. 2076421 A, the disclosure of which is incorporated herein by reference, and $R_1$ is an aromatic or heterocyclic diazo or coupling component.

In this published patent application, the dyestuffs of formulae III, IV, V and VI, together with the Examples, are of particular importance.

Dyeings and printings with basic dyestuffs often show inadequate wash fastness. The dyesuff which is bound to the surface of the cellulose fibres is largely removed from the fibres by repeated washings, and bleeding of the dyestuff into the wash liquid can cause partial readsorption onto undyed cellulose material.

There have been many attempts to overcome these disadvantages, but the problem with all previously used methods is that although improved fastness is indeed attained, the results are only temporary.

Treatment of dyed or printed cellulose substrates according to the invention gives improved wet fastness properties, particularly fastness to washing, including washing under alkaline or acid conditions at temperatures of 40°-90° C., particularly at 60° C. and above. For example, repeated 30 minute 60° C. washings with a wash liquor containing 5 g/l soap and 2 g/l soda at a goods to liquor ratio of 1:50 are readily withstood.

This improvement in wet fastness is obtained without loss of light fastness; indeed light fastness properties may actually be improved.

At the same time a resin finish is imparted to the cellulose fibres which gives reduced swelling in aqueous or alkaline media and hence more rapid drying, improved dimensional stability and higher crease resistance.

The following Examples, in which all parts and percentages are by weight and all temperatures in degrees Centigrade, illustrate the invention.

Preparation of fixing agents (A) 103 Parts diethylene triamine and 84 parts DCDA are heated at 110°. As soon as this temperature is reached an exothermic reaction takes place and ammonia escapes. The temperature is slowly raised to 160° and kept there for about 6 hours until no more ammonia is released. The amount of ammonia is about 34 parts. The liquid reaction product is poured onto a flat metal pan and ground to a powder after it is cold.

69.3 Parts of this powder is added slowly to 81 parts water at 35° stirring constantly. Then 53.4 parts of 44.6% sulphuric acid are added simultaneously with 45.0 parts of ice so that the temperature does not rise above 48°-50°. Afterwards a further 69.3 parts of the powder are added, and once again neutralized with 78.8 parts of 44.6% sulphuric acid and 45.0 parts of ice so that the temperature stays under 50°. The yellow solution which has a pH of 7.5 is then spray-dried, to give a white powder.

18.3 Parts DCDA and 362.6 parts of a 50% solution of dimethyloldihydroxyethyleneurea are stirred together and diluted with 147.2 parts water. 54.3 Parts magnesium chloride hexahydrate are added, then 72.6 parts of the above spray dried product, and the mixture is stirred at 30° until all solids have dissolved to give a solution of approx. pH 4.5. The mixture is then heated to 70° over 45 minutes, held for 1½ hours at 70°–74° and cooled to give a clear stable yellow solution.

(B)—(D) The reaction product of epichlorohydrin and dimethylamine is reacted with dimethyloldihydroxyethyleneurea and magnesium chloride as described in Examples 1–3 of British patent application No. 2 084 597.

(E) The reaction product of 1,2-bis(dimethylamino)ethane and 2,2′-dichlorodiethyl ether is reacted with dimethyloldihydroxyethyleneurea and magnesium chloride as described in Example 4 of British patent application No. 2 084 597.

(F) 103 Parts diethylene triamine and 84 parts DCDA are heated to 110°. At this temperature an exothermic reaction begins and ammonia is evolved. The temperature is allowed to rise to 150°, then held at 160° for 6 hours to complete the reaction. Finally the reaction product is cooled until it solidifies, then pulverized.

156 Parts of this powder are suspended in 400 parts by volume of water and the mixture warmed to 80°–90°; the powder gradually dissolves, to give a solution having a pH value of about 11. After cooling to 50°, 343 parts of a 35% aqueous formaldehyde solution are added dropwise. The reaction mixture is stirred for a further 2 hours at 50° then cooled to room temperature and neutralized with hydrochloric acid, to give 930 parts of a clear yellow solution containing about 30% dry weight of a precondensate of diethylenetriamine/DCDA with formaldehyde.

(G)—(I) The preparation of product (F) is repeated, but with the pH adjusted by addition of hydrochloric acid to 8, 6 or 4 respectively, before addition of formaldehyde.

(J),(K) The solid reaction product of diethylene triamine and DCDA is prepared as described above under (F). Two lots of 90 parts of this powder are each dissolved in 330 parts by volume of water and reacted at pH 11 with 227 parts and 340 parts respectively of 35% aqueous formaldehyde.

EXAMPLE 1

A cotton fabric is dyed by conventional methods with the dyestuff of Example 42 of British Patent Application 2 076 421, in metal-free form. The dyed fabric is padded with a solution containing 100 g/l of fixing agent (A), and squeezed out to a pickup of 80%. The impregnated fabric is shock dried on a tension frame at 175°–180° such that the condensation time after drying is approximately 30–45 seconds.

The resulting yellow dyeing shows good wet-, wash- and light-fastness, which is retained after repeated 60° washings, and even after washing at the boil. At the same time the crease resistance is improved and the swelling of the cellulose fibres is reduced.

EXAMPLES 2–5

Example 1 is repeated using cotton fabric dyed with the phthalocyanine dyestuff of British Pat. No. 1 185 791, and aftertreating with fixing agents (B)–(E). Dyeings with good fastness properties are obtained.

EXAMPLE 6

A cotton fabric is dyed with the dyestuff of Example 68 of European Patent Application 51 041, rinsed and dried. The dyed fabric is padded with a liquor containing 30 g/l fixing agent (F) (as 100% active material), 50 g/l dimethyloldihydroxyethyleneurea and 15 g/l MgCl$_2$.6H$_2$O, and adjusted to pH 4 with acetic acid; then squeezed out to 80% pickup. The fabric is shock dried at 180° on a tension frame, the condensation time being about 30–45 seconds. The fixed dyeing has excellent wash- and light-fastness.

EXAMPLE 7–10

Example 6 is repeated using fixing agents (G)–(K). Similar good results are obtained.

EXAMPLE 11

A cotton fabric is dyed with the dyestuff of Example 80 of European Patent Application 51 041, rinsed and dried. The procedure of Example 6 is repeated on this dyeing, except that the padding liquor contains 50 g/l of fixing agent (F), 15 g/l MgCl$_2$.6H$_2$O and no N-methylol compound. The fixed dyeing has excellent wash- and light-fastness.

EXAMPLE 12

The dyed fabric of Example 11 is padded at 80% pickup with a solution containing 70 g/l (as 100% active substance) of fixing agent (F) and 15 g/l MgCl$_2$.6H$_2$O. The impregnated fabric is dried to 2–4% residual moisture than condensed for 60 seconds at 180°. Good fastness properties are obtained.

EXAMPLE 13

A cotton fabric is dyed by the exhaust process from an aqueous bath containing the dyestuff of Example 1 of British Patent 1 547 900, 40 g/l of fixing agent A and 0.25 g/l 80% acetic acid. Dyeing is carried out at the boil for approx. 90 minutes, until a 2% dyeing is obtained. The fabric is rinsed and dried, giving a dyeing of improved wash and light fastness.

EXAMPLE 14

A 100% rayon fabric is dyed according to Example 13, but using 80 g/l of fixing agent B instead of 40 g/l of A, a 3% dyeing being obtained. The dyed fabric is rinsed and dried to give a dyeing of improved wash and light fastness.

We claim:

1. A method for improving the fastness of a dyeing or printing made with a basic dyestuff on a cellulosic fibrous substrate which comprises applying to the substrate, either in admixture with or subsequently to the basic dyestuff, a fixing agent comprising:

I. a water-soluble precondensate of (A) with (C),
II. a mixture of (A) and (C),
III. a water-soluble precondensate of (A) with (D),
IV. a mixture of (A) and (D),
V. a water-soluble precondensate of (A) with (C) and (D),
VI. a mixture of (A), (C) and (D),
VII. a water-soluble precondensate of (B) with (C),
VIII. a mixture of (B) and (C),
IX. a water-soluble precondensate of (B) with (D),
X. a mixture of (B) and (D), XI. a water-soluble precondensate of (B) with (C) and (D) or, XII. a mixture of (B), (C) and (D), wherein
(A) is the product of reacting a mono- or polyfunctional primary or secondary amine with cyanamide, dicyandiamide, guanidine or biguanidine, with the proviso that up to 50 mole % of the cyanamide, dicyandiamide, guanidine or biguanidine may be replaced with a dicarboxylic acid or a mono- or di-ester thereof, said product (A) containing reactive hydrogen atoms bound to nitrogen, (B) is a quaternary polyalkylene polyamine having recurring units of the formula II′

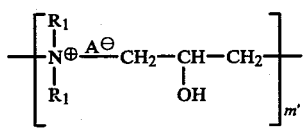

where
$R_1$ is $C_{1-4}$alkyl
$m'$ is 20–30 and,
$A^\ominus$ is an anion.

(C) is formaldehyde or a formaldehyde precursor and, (D) is an N-methylol derivative of a urea, melamine, guanamine, triazinone, urone, carbamate or acid amide.

2. A method according to claim 1 in which the substrate is treated with the fixing agent subsequently to applying the basic dye.

3. A method according to claim 1 in which the fixing agent comprises I, II, III, IV, V, VI, VII or X.

4. A method according to claim 9 in which the fixing agent contains catalyst (E).

5. A method according to claim 1 in which component (A) is the reaction product of a polyfunctional amine of formula I $$RRN{+}Z{-}X)_{\overline{n}}Z{-}NRR \qquad I$$

in which each
R independently is hydrogen or a $C_{1-10}$alkyl group unsubstituted or monosubstituted with hydroxy, $C_{1-4}$alkoxy or cyano,
n is a number from 0 to 100
Z, or each Z independently when n>0, and $C_{1-4}$alkylene or hydroxyalkylene and, X, or each X independently when n>1, is —O—, —S— or —NR— where R is as defined above,
provided that the amine of formula I contains at least one reactive —NH— or —NH$_2$ group, with cyanamide, DCDA, guanidine or biguanidine.

6. A method according to claim 1 in which component (D) is selected from N,N′-dimethylol-4,5-dihydroxy- or 4,5-dimethoxyethyleneurea, N,N′-dimethylol-4-methoxy-5,5-dimethylpropyleneurea, N,N′-dimethylol carbamates and their methyl and ethyl ethers.

7. A method according to claim 10 in which catalyst (E) is magnesium chloride.

8. A method according to claim 1 in which the basic dyestuff has a molecular weight (in cationic or protonated form without metal ions) of from 400 to 1200 and gives a degree of exhaustion on mercerised cotton in a 1/1 standard depth dyeing from an electrolyte-free dyebath at a goods to liquor ratio of 1:20, after 90 minutes at the boil, of from 50–100%.

9. A method according to claim 1 which further comprises applying to the substrate, either separately from or in admixture with the fixing agent, a catalyst (E) for cross-linking of N-methylol compounds of type (D).

10. A method according to claim 9 wherein catalyst (E) is selected from the group consisting of the nitrates, sulphates, chlorides and dihydrogen orthophosphates of aluminum, magnesium and zinc.

11. A method according to claim 9 which comprises the further step of heat-curing the substrate subsequent to applying the fixing agent and the catalyst.

12. A method according to claim 10 which comprises the further step of heat-curing the substrate subsequent to applying the fixing agent and the catalyst.

13. A method according to claim 11 wherein component (A) is the reaction product of a polyfunctional amine of formula I $$RRN{+}Z{-}X)_{\overline{n}}Z{-}NRR \qquad I$$

in which each
R independently is hydrogen or a $C_{1-10}$alkyl group unsubstituted or monosubstituted with hydroxy, $C_{1-4}$alkoxy or cyano,
n is a number from 0 to 100
Z, or each Z independently when n>0, is $C_{1-4}$alkylene or hydroxyalkylene and
X, or each X independently when n>1, is —O—, —S— or —NR— where R is as defined above,
provided that the amine of formula I contains at least one reactive —NH— or —NH$_2$ group, with cyanamide, DCDA, guanidine or biguanidine.

14. A method according to claim 4 wherein the fixing agent is I, III, V or IX and XI are prepared in the presence of (E).

15. A method according to claim 13 wherein, in the compound of formula I,
R is hydrogen or $C_{1-4}$alkyl or hydroxyalkyl
n is 0 to 30
Z is 1,2-ethylene, 1,3-propylene or 1,3-(2-hydroxypropylene) and
X is —NR—, and catalyst
(E) is selected from the group consisting of the nitrates, sulphates, chlorides and dihydrogen orthophosphates of aluminum, magnesium and zinc.

16. A method according to claim 15 wherein component (A) is a reaction product of diethylene triamine or triethylene tetramine with dicyandiamide.

17. A method according to claim 12 wherein component (A) is the reaction product of a polyfunctional amine of formula I $$RRN{+}Z{-}X)_{\overline{n}}Z{-}NRR \qquad I$$

in which each
R independently is hydrogen or a $C_{1-10}$alkyl group unsubstituted or monosubstituted with hydroxy, $C_{1-4}$alkoxy or cyano,
n is a number from 0 to 100
Z, or each Z independently when n>0, is $C_{1-4}$alkylene or hydroxyalkylene and,
X, or each X independently when n>1, is —O—, —S— or —NR— where R is as defined above,
provided that the amine of formula I contains at least one reactive —NH— or —NH$_2$ group, with cyanamide, DCDA, guanidine or biguanidine and component (D) is a member of the group consisting of N,N'-dimethylolurea, N,N'-dimethylolurea dimethyl ether, N,N'-tetramethylolacetylenediurea, N,N'-dimethylolpropyleneurea, 4,5-dihydroxy-N,N'-dimethylolethyleneurea, 4,5-dihydroxy-N,N'-dimethylolethyleneurea dimethyl ether, N,N'-dimethylol-5-hydroxypropyleneurea, N,N'-dimethylol-4-methoxy-5,5-dimethylpropyleneurea, N,N'-dimethylolethyleneurea, methoxymethylmelamine, dimethylolalkandioldiurethanes, N,N'-dimethylol-5-alkylhexahydro-1,3,5-triazin-2-ones, N,N'-dimethylolurone and dimethylolcarbamates.

18. A method according to claim 9 wherein the fixing agent comprises II, IV, IX or X and the weight ratio of (A) or (B):(D):(E) is in the range of 1:0.625–22:0.025–6.

19. A method according to claim 3 in which the fixing agent comprises I, III, V or IX.

20. A method according to claim 19 in which the fixing agent comprises III.

21. A method according to claim 15 wherein component D is selected from N,N'-dimethylol-4,5-dihydroxyethyleneurea, N,N'-dimethylol-4,5-dimethoxyethyleneurea, N,N'-dimethylol-4-methoxy-5,5-dimethylpropyleneurea, N,N'-dimethylol carbamates and the methyl and ethyl ethers of said compounds.

22. A dyebath or printing paste containing a basic dyestuff and a fixing agent comprising
I. a water-soluble precondensate of (A) with (C),
II. a mixture of (A) and (C),
III. a water-soluble precondensate of (A) with (D),
IV. a mixture of (A) and (D),
V. a water-soluble precondensate of (A) with (C) and (D),
VI. a mixture of (A), (C) and (D),
VII. a water-soluble precondensate of (B) with (C),
VIII. a mixture of (B) and (C),
IX. a water-soluble precondensate of (B) with (D),
X. a mixture of (B) and (D),
XI. a water-soluble precondensate of (B) with (C) and (D) or, XII. a mixture of (B), (C) and (D),
wherein
(A) is the product of reacting a mono- or polyfunctional primary or secondary amine with cyanamide, dicyandiamide, guanidine or biguanidine, with the proviso that up to 50 mole % of the cyanamide, dicyandiamide, guanidine or biguanidine may be replaced with a dicarboxylic acid or a mono- or di-ester thereof, said product (A) containing reactive hydrogen atoms bound to nitrogen,
(B) is a quaternary polyalkylene polyamine having recurring units of the formula II'

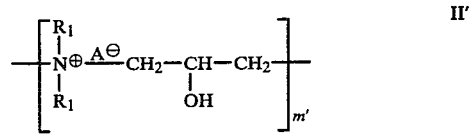

where
$R_1$ is $C_{1-4}$alkyl
$m'$ is 20–30 and,
$A^{\ominus}$ is an anion,
(C) is formaldehyde or a formaldehyde precursor and,
(D) is an N-methylol derivative of a urea, melamine, guanamine, triazinone, urone, carbamate or acid amide.

23. A dyebath or printing paste according to claim 22 wherein the fixing agent comprises I, II, III, IV, V, VI, IX or X.

24. A dyebath or printing paste according to claim 23 wherein the fixing agent comprises I, III, V or IX.

25. A dyebath or printing paste according to claim 24 wherein the fixing agent comprises III.

26. A method according to claim 21 wherein component (A) is the reaction product of diethylene triamine with dicyandiamide, component (D) is N,N'-dimethylol-4,5-dihydroxyethyleneurea and component (E) is magnesium chloride.

27. A dyebath or printing paste according to claim 25 wherein the fixing agent comprises a water-soluble precondensate of the reaction product of diethylene triamine with dicyandiamide and N,N'-dimethylol-4,5-dihydroxyethyleneurea.

* * * * *